United States Patent [19]
LaBarre et al.

[11] Patent Number: 5,598,476
[45] Date of Patent: Jan. 28, 1997

[54] RANDOM CLOCK COMPOSITION-BASED CRYPTOGRAPHIC AUTHENTICATION PROCESS AND LOCKING SYSTEM

[75] Inventors: Robert E. LaBarre, Willington; Philip J. Koopman, Jr., Hebron, both of Conn.

[73] Assignee: United Technologies Automotive, Inc., Dearborn, Mich.

[21] Appl. No.: 548,384

[22] Filed: Oct. 26, 1995

Related U.S. Application Data

[63] Continuation of Ser. No. 425,595, Apr. 20, 1995, abandoned.
[51] Int. Cl.$^6$ ........................................................ H04L 9/00
[52] U.S. Cl. ............................... 380/23; 380/9; 380/21; 380/46; 380/49; 340/825.31; 340/825.34
[58] Field of Search .................................. 380/9, 21, 23, 380/25, 28, 46, 49; 340/825.31, 825.34

[56] References Cited

U.S. PATENT DOCUMENTS

| | | |
|---|---|---|
| 4,436,419 | 4/1988 | Roe . |
| 4,596,985 | 6/1986 | Bongard et al. . |
| 4,691,291 | 9/1987 | Wolfram . |
| 4,758,835 | 7/1988 | Rathmann et al. ................. 340/825.31 |
| 4,847,614 | 7/1989 | Keller . |
| 5,060,265 | 10/1991 | Finkelstein . |
| 5,144,667 | 9/1992 | Pogue, Jr. et al. ..................... 380/25 X |
| 5,146,215 | 9/1992 | Drori .............................. 340/825.31 X |
| 5,280,267 | 1/1994 | Reggiani . |
| 5,319,364 | 6/1994 | Waraksa et al. . |
| 5,363,448 | 11/1994 | Koopman, Jr. et al. .................. 380/23 |
| 5,369,706 | 11/1994 | Latka ........................................ 380/23 |
| 5,377,270 | 12/1994 | Koopman, Jr. et al. .................. 380/25 |
| 5,398,284 | 3/1995 | Koopman, Jr. et al. . |
| 5,412,379 | 5/1995 | Waraksa et al. . |
| 5,420,925 | 5/1995 | Michaels . |

OTHER PUBLICATIONS

Edwin L. Key, "An Analysis of the Structure and Complexity of Nonlinear Binary Sequence Generators", 6 Nov. 1976, pp. 732–736.

Primary Examiner—Bernarr E. Gregory

[57] ABSTRACT

The first and second devices exchange randomly generated messages that are used in a composition-based encryption/decryption process. At least one of the randomly generated messages is, itself, encrypted before transmission. The composition-based process (a cyclic redundancy code process, preferably enhanced with midcycle non-Galois Field operation) is embedded in both devices and not readily discernable by playback attack.

27 Claims, 3 Drawing Sheets

RANDOM CLOCK COMPOSITION-BASED CRYPTOGRAPHIC AUTHENTICATION PROCESS AND LOCKING SYSTEM

This application is a continuation of application Ser. No. 08/425,595 filed Apr. 20 1995, now abandoned.

BACKGROUND AND SUMMARY OF THE INVENTION

The present invention relates generally to cryptography, and in particular to a method and apparatus for authenticating the access dialog between two devices in an electronic locking system. The authentication process uses a randomly generated clocking key that is itself encrypted, which renders the locking system highly attack resistant.

User authentication is a major concern in anti-theft systems. Any anti-theft system, particularly wireless radio frequency and infrared transmission systems, is subject to playback attack, where a would-be intruder simply records the authentication transmission and plays it back later to gain access. Cryptographic authentication systems provide some degree of security from this type of attack, although at some additional cost. Ideally, the goal of a cryptographic authentication system is to strengthen the security while keeping implementation costs low. This usually involves a trade off between high security and low cost.

As a first step in immunizing a system against playback attack some systems exchange codes during an access dialog in which each device verifies the authenticity of the other. Typically this is done by exchanging a secret code such as a clocking key known to both devices. In response to the secret code, the devices may exchange further authentication information with each other. Often, the codes exchanged are purposefully changed from one access dialog to the next, so that a would-be thief cannot simply record one cycle and play back that dialog to gain access in future cycles.

One problem with such conventional clocking key techniques is that the clocking key can be cryptographically analyzed to determine the nature of the cryptographic process employed by the two devices. In other words, knowing the clocking key, a savvy intruder can program a computer to perform a sequence of experiments, using the intercepted clocking key. This will eventually reveal the nature of the encryption process used by the two devices. Once the encryption process is known, the would-be thief can simply duplicate the process and thereby unlock the electronic lock.

The present invention addresses this problem by providing a system that relies on a randomly generated clocking key that is, itself, encrypted. Being randomly generated, the clocking key changes randomly with every access dialog. Hence attack by cryptographic analysis is rendered significantly more difficult. If a would-be thief records the clocking key during one dialog, that clocking key will be of no value in performing cyclic or iterative experiments designed to discover the nature of the embedded encryption process. This is so because the next access dialog relies on a new randomly generated number that the would-be thief has no prior knowledge of. To add further security, the randomly generated clocking key may itself be encrypted prior to transmission.

By way of summary, the invention provides an attack-resistant process for authenticating an access dialog between a first device and a second device in an electronic locking system. At the first device a random first clocking key is generated and that clocking key is encrypted to produce an encrypted clocking key. The encrypted clocking key is then communicated to the second device. At the first device the first clocking key is also used to perform a composition process that generates a first response code.

At the second device the encrypted clocking key communicated by the first device is decrypted to recover a second clocking key. The second clocking key is used to perform a composition process that generates a second response code. Thereafter at least one of the first and second devices, the first and second response codes are compared, resulting in authentication of the access dialog if the first and second response codes match.

For a more complete understanding of the invention, its objects and advantages, refer to the following specification and to the accompanying drawings.

DESCRIPTION OF THE PREFERRED EMBODIMENT

The authentication process and locking system can be used in a number of different applications. For purposes of illustration the system will be shown in an automotive vehicle application in which one device (the sentinel or lock) is physically located on the vehicle and the other device (the requestor or key) takes the form of a miniaturized portable device, such as a key fob. In a typical application, the first device locks or controls access to vehicle entry, vehicle ignition, or the like. Thus, the invention can be used in a wireless remote access vehicle entry system, or in an anti-theft ignition system. The wireless remote access entry system allows the vehicle owner to lock and unlock the vehicle doors without the use of a conventional toothed key. The anti-theft system prevents the vehicle ignition system from being energized if the electronic locking system of the invention does not recognize a valid authentication sequence. Of course, the invention can be used in other types of crypto systems, as well. These include networked computer systems.

Figure 1:
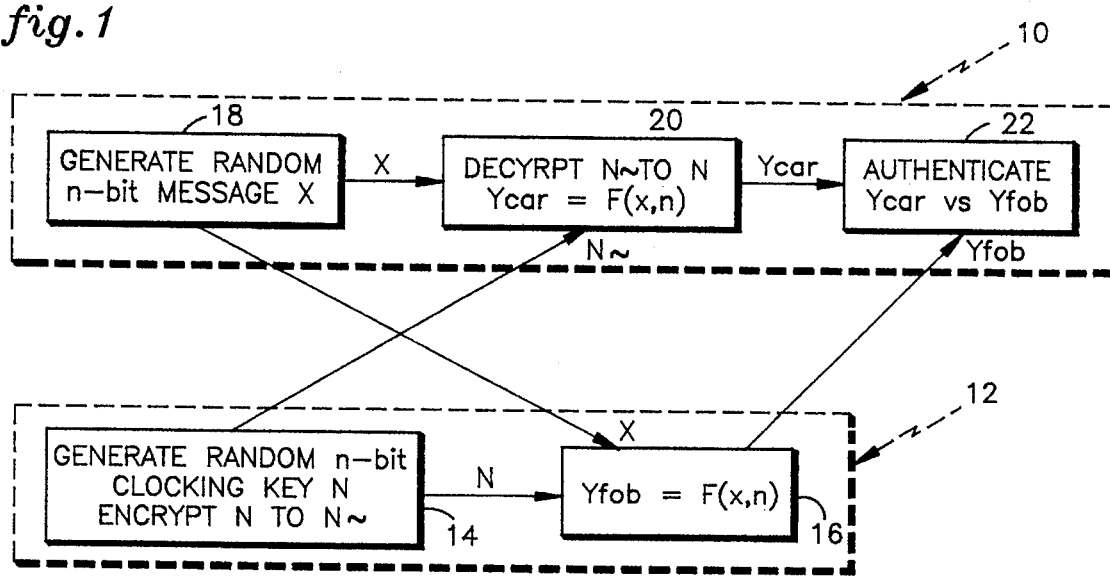
FIG 1 is a block diagram illustrating the data flow between the two devices implementing the invention.

Referring to FIG. 1, the invention is implemented in two devices 10 and 12. Device 10 may be embodied in the locking mechanism of a car, for example; device 12 may be embodied in a miniaturized key fob circuit, for example. Devices 10 and 12 perform an access dialog represented by the arrows labeled N~, X and $Y_{fob}$. As illustrated, this access dialog takes place between the two devices and the dialog is therefore potentially interceptable by eavesdroppers. As illustrated, devices 10 and 12 each have modules for performing certain functions. These modules also communicate with one another, as depicted by the bold face arrows in FIG. 1. Because these are internal messages (from one module to another within a single device) these messages are not readily accessible to eavesdroppers.

To understand the access dialog sequence, refer first to module 14 in device 12. This module generates a random n-bit clocking key N. This module also encrypts the clocking key N to produce the encrypted clocking key N~. The nonencrypted clocking key N is passed to module 16 over the secure or internal channel (bold faced arrow), while the encrypted clocking key N~ is passed to device 10 over the nonsecured channel (light arrow).

In response to the communication from device 12 module 18 of device 10 generates a random n-bit message X. This message is sent over the nonsecured channel to device 12. Note that in the presently preferred embodiment it is not necessary to encrypt message X, however message X can be encrypted if desired. Module 18 also communicates message X over the secure channel to module 20. Module 20 decrypts the encrypted n-bit clocking key N~ to recover the unencrypted clocking key N. Module 20 then uses the unencrypted clocking key and message X to perform a composition based process to yield a response message $Y_{car}$. This response message is then passed via secure channel to the authentication module 22.

Meanwhile, module 16 of device 12 computes a composition based response message of its own. The response message $Y_{fob}$ is the result of the same composition process used by module 20. Module 16 performs the composition process using the message X, received from device 10 and the unencrypted n-bit clocking key N received via the secure channel from module 14. Module 16 then communicates the response message $Y_{fob}$ to the authentication module 22, where it is compared with the response message $Y_{car}$. If the two response messages match then the access dialog results in a determination that the communication is authentic. If the messages do not match then the dialog is deemed to be nonauthentic and access is denied.

Figure 2:
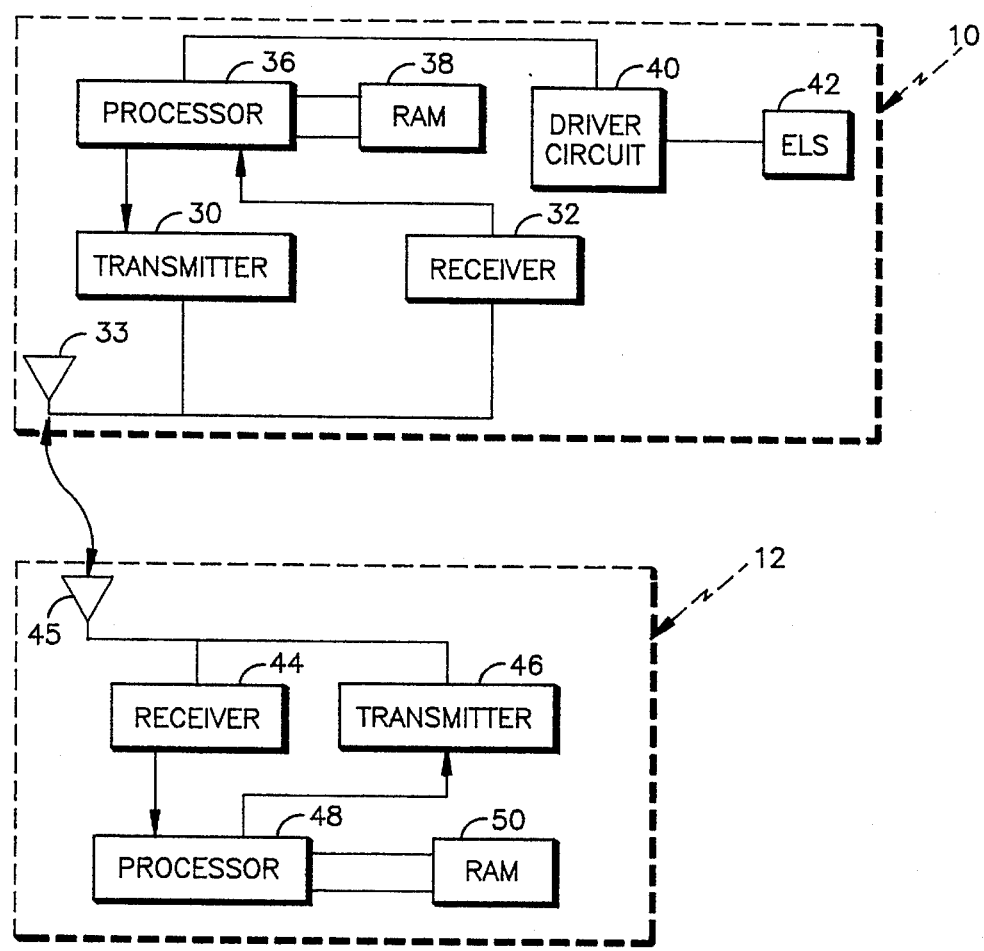
FIG. 2 is a hardware block diagram illustrating the components useful in implementing the invention.

FIG. 2 illustrates an exemplary hardware embodiment with which the invention can be practiced. Device 10 includes transmitter 30 and receiver 32 which are coupled to antenna 33. Device 10 also includes a processor 36 with random access memory 38. The processor is connected to the transmitter and receiver via the serial input/output port. Device 10 also includes a suitable driver circuit 40, coupled to processor 36, for operating the electronic locking system 42. Electronic locking system may be implemented as part of the vehicle entry lock or the vehicle ignition system.

Device 12 comprises receiver 44 and transmitter 46, each coupled to antenna 45. Device 12 further comprises processor 48 and random access memory 50. Receiver 44 and transmitter 46 are coupled to processor 48 via the serial input/output port. Devices 10 and 12 participate in an access dialog by wireless communication between antenna 33 and antenna 45.

Figure 3:
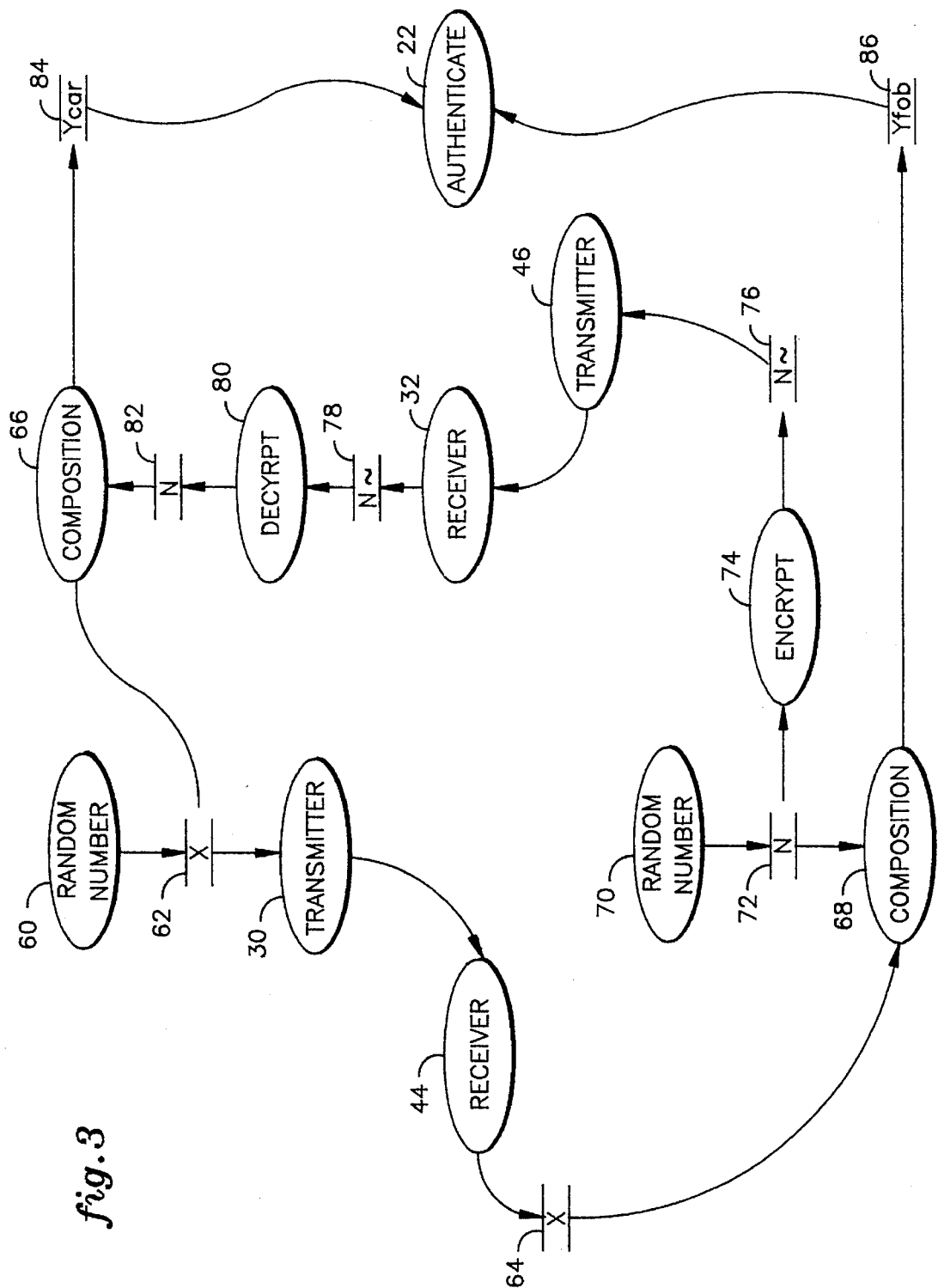
FIG. 3 is an entity relationship diagram illustrating the data flow and operation of the authentication process of the invention.

Referring to FIG. 3, a data flow entity relationship diagram shows the software components of devices 10 and 12 and shows how the system is designed to operate. Where applicable, entities have been assigned reference numerals that correspond to the hardware devices illustrated in FIGS. 1 and 2. Specifically, transmitter 30 and receiver 32, and receiver 44 and transmitter 46 correspond to the like numbered components in FIG. 2. Also, the authenticate process 22 corresponds to the like numbered process illustrated in FIG. 1. Note, that the authenticate process can be performed at either device 10 or device 12. In FIG. 1 the process is illustrated as being part of device 10. However, the invention can also be practiced by embedding the authentication process 22 in device 12, or by implementing the authentication process in a separate device not directly associated with either devices 10 or 12.

Referring to FIG. 3, process 60 generates a random number X that may be stored at 62. With reference to FIG. 2, the random number generation process can be performed by processor 36 and the random number X may be stored in random access memory 38. As illustrated in FIG. 3, random number X is conveyed to transmitter 30, which, in turn, communicates the value X to receiver 44. Receiver 44 in turn stores the value X at 64. With reference to FIG. 2, the value X is passed from receiver 44 through processor 48 for storage in random access memory 50. Thus at this point in the access dialog both device 10 and device 12 have a stored copy of the random number X. Also, note that the communication between transmitter 30 and receiver 44 takes place across an nonsecured channel. Thus an eavesdropper may have access to the value X by monitoring the transmission.

The random number X stored at 62 is passed to a composition process 66. Similarly, the random number X stored at 64 is passed to composition process 68. Composition process 66 is performed by the processor 36 of device 10; composition process 68 is performed by processor 48 of device 12. Both devices perform essentially the same composition process on the random number X using another random number N yet to be described. The presently preferred embodiment uses an enhanced cyclic redundancy CRC process that is also described more fully below, and the order of the composition is governed by the clocking key N described be low.

The random number N is generated by process 70 and stored at 72. Random number generation 70 may be performed by processor 48 of device 12 and stored in random access memory 50. As shown in FIG. 3, the random number N, stored at 72, is supplied to encryption process 74 and also to composition process 68. Encryption process 74 can be implemented by processor 48 of device 12. The encrypted number N~ that is stored at 76. The encrypted number N~ is then conveyed to transmitter 46 where it is then communicated to receiver 32. The communication between transmitter 46 and receiver 32 is over a nonsecured channel. However, because the random number N is not repeated on subsequent access dialog cycles, and because the number is also encrypted, an eavesdropper can make little practical use of the number N~.

Receiver 32 conveys the encrypted number N~ for storage at 78. Referring to FIG. 2, N~ is stored by passing the received value from receiver 32 to processor 36 for storage in random access memory 38. After storage, the decryption process 80 is performed to retrieve the original random number N, which is stored at 82. Decryption process 80 may be performed by processor 36 with storage in random access memory 38. The unencrypted number N, stored at 82, is then passed to composition process 66.

Because composition processes 66 and 68 perform the same operation, they will yield the same response message Y if the input values X and N are identical. The precise cryptographic process performed by composition processes 66 and 68 is embedded in devices 10 and 12 and maintained secret. The output or result of composition process 66 is $Y_{car}$ that is stored at 84. The output or result of composition process 68 is stored as $Y_{fob}$ at 86. $Y_{car}$ and $Y_{fob}$ are compared by the authentication process 22. Only if these values match is access granted (electronic lock opens).

Without knowing the precise details of composition processes 66 and 68, a would-be thief has minimal opportunity to break the lock. Because the values X and N~ are random (i.e. not cyclic or predictable) monitoring these values provides the would-be thief with little opportunity to infer the nature of the composition processes. Thus, even if the would-be thief repeatedly attempts authentication by transmitting repeated (false) authentication probes, this yields no additional information because the clocking key used to generate the response Y is unknown to the would-be thief.

The transmission of N from the device 12 to device 10 is required because the device 10 must perform a similar analysis on the authentication message in order to know what to expect as the response from device 12. Since N must be transmitted, performing a simple encryption operation to produce N~ requires the would-be thief to first decrypt the clocking key N before it can be used to generate the impending response. Unfortunately for the would-be thief, the next transmission intercepted from device 12 to device 10 is based on a different N, foiling the decryption attempt. As a consequence the would-be thief has only one message (X), one encrypted response ($Y_{fob}$) and one encrypted clocking key (N) to work with. With only this information it is extremely unlikely that the authentication code may be broken.

As noted above, the presently preferred embodiment uses an enhanced cyclic redundancy code (CRC) methodology. That methodology will now be described, although it will be understood that other processes may be substituted for the cyclic redundancy code process, if desired. The presently preferred embodiment enhances or extends the CRC methodology by performing a midscramble non-Galois Field arithmetic operation.

The enhanced CRC process introduces nonlinearities into the standard CRC process by performing an operation over the Real Field or Integer Ring, in the middle of the CRC process. As used herein the terms Real Field and Integer Ring are used essentially synonymously. This technique introduces significant complexity, making cryptographic analysis far more difficult. The inclusion of an Integer Ring operation, such as Integer Ring addition, superimposes a supplemental encryption function over and above the basic CRC process. This, in effect, gives two simultaneous levels of encryption or scrambling, essentially for the price of one.

The present invention can be implemented to operate on digital information comprising any desired number of bits. For example, in a keyless entry system a 32 bit CRC process (with a secret feedback polynomial) may be used to scramble a 32 bit piece of digital information such as message X and clocking key N. The CRC process is equivalent to multiplication in a Galois Field $GF(2^n)$. The CRC can be computed as 32 iterations of a shift and exclusive OR with mask operation. In the present invention, two secret feedback polynomials are used, determining two enhanced CRCs. Functionally, we call these processes f and g. The composition of these enhanced CRC processes coincides with the composition of the functions f and g, and the order of the composition is governed by the clocking key N.

Figure 4:
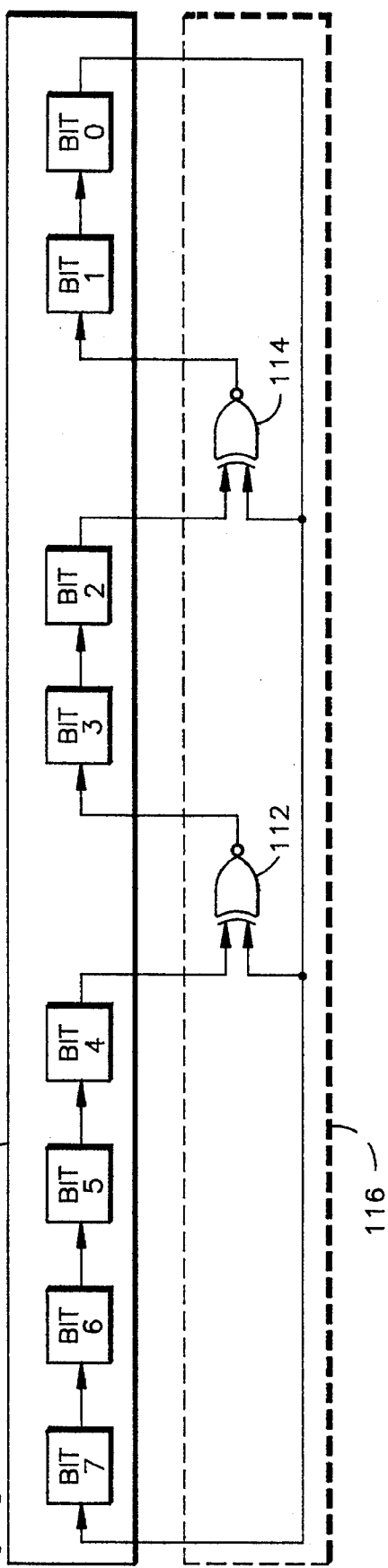
FIG. 4 is a block diagram illustrating an example of a linear feedback shift register useful in understanding the cyclic redundancy code composition process of the invention.

To illustrate the principle, an 8 bit CRC process will be illustrated. It will, of course, be understood that the invention is not restricted to any bit size number. Referring to FIG. 4, the individual bits residing in register 110 have been designated in the boxes labeled bit 0-bit 7 consecutively. In general, register 110 is configured to cycle from left to right so that bit 7 shifts right to supply the input to bit 6, bit 6 to bit 5, and so forth (with the exception of those bits involved in the exclusive OR operations). As illustrated, bit 0 shifts back to bit 7, thereby forming a cycle or loop.

In addition to the shift operation, the digital information in register 110 is also subjected to one or more exclusive OR operations. In FIG. 4, exclusive OR operations 112 and 114 have been illustrated. Exclusive OR operation 112 receives one of its inputs from bit 4 and the other of its inputs from bit 0. Exclusive OR 112 provides its output to bit 3. Similarly, exclusive OR 114 receives its inputs from bit 2 and bit 0 and provides its output to bit 1. The two exclusive OR operations illustrated in FIG. 4 are intended to be merely exemplary, since, in general, any number of exclusive OR operations may be used, ranging from none up to the number of digits in the register (in this case 8). Also, the exclusive OR operations may be positioned between any two adjacent bits, in any combination. Thus, the positioning of exclusive OR operations between bits 3 and 4 and between bits 1 and 2 as shown in FIG. 4 is merely an example.

The exclusive OR operations selected for a given encryption may be viewed as a mask wherein the bits of the mask are designated either 1 or 0, depending on whether an exclusive OR operation is present or not present. Thus, in FIG. 4, the mask may be designated generally at 116.

Table I illustrates the shift register bit patterns for the register and mask combination of FIG. 4. The Table lists at the top an exemplary initial bit pattern (to represent an exemplary byte or word of digital information), followed by the resulting bit patterns for each of 8 successive iterations or cycles.

Table I depicts all of the possible successive bit patterns for the circuit of FIG. 4. Because the exclusive OR gates of FIG. 4 do not correspond to a primitive polynomial, the circuit is not a maximal length feedback shift register. That it is not maximal length is obvious by inspection of Table I. Each separate column of binary numbers represents successive steps of the circuit of FIG. 4. A shift of the last number in a column (equivalently a cycle) produces the number at the top of the column. There are 20 different cycles of length between 2 and 14.

TABLE I

| 00000001 | 00000011 | 00000101 | 00000111 | 00001001 | 00001011 | 00001101 |
|---|---|---|---|---|---|---|
| 10001010 | 10001011 | 10001000 | 10001001 | 10001110 | 10001111 | 10001100 |
| 01000101 | 11001111 | 01000100 | 11001110 | 01000111 | 11001101 | 01000110 |
| 10101000 | 11101101 | 00100010 | 01100111 | 10101001 | 11101100 | 00100011 |
| 01010100 | 11111100 | 00010001 | 10111001 | 11011110 | 01110110 | 10011011 |
| 00101010 | 01111110 | 10000010 | 11010110 | 01101111 | 00111011 | 11000111 |
| 00010101 | 00111111 | 01000001 | 01101011 | 10111101 | 10010111 | 11101001 |
| 10000000 | 10010101 | 10101010 | 10111111 | 11010100 | 11000001 | 11111110 |
| 01000000 | 11000000 | 01010101 | 11010101 | 01101010 | 11101010 | 01111111 |
| 00100000 | 01100000 | 10101000 | 11100000 | 00110101 | 01110101 | 10110101 |
| 00010000 | 00110000 | 01010000 | 01110000 | 10010000 | 10110000 | 11010000 |

TABLE I-continued

| | | | | | | |
|---|---|---|---|---|---|---|
| 00001000 | 00011000 | 00101000 | 00111000 | 01001000 | 01011000 | 01101000 |
| 00000100 | 00001100 | 00010100 | 00011100 | 00100100 | 00101100 | 00110100 |
| 00000010 | 00000110 | 00001010 | 00001110 | 00010010 | 00010110 | 00011010 |
| 00001111 | 00010011 | 00010111 | 00011001 | 00011011 | 00011101 | 00100111 |
| 10001101 | 10000011 | 10000001 | 10000110 | 10000111 | 10000100 | 10011001 |
| 11001100 | 11001011 | 11001010 | 01000011 | 11001001 | 01000010 | 11000110 |
| 01100110 | 11101111 | 01100101 | 10101011 | 11101110 | 00100001 | 01100011 |
| 00110011 | 11111101 | 10111000 | 11011111 | 01110111 | 10011010 | 10111011 |
| 10010011 | 11110100 | 01011100 | 11100101 | 10110101 | 01001101 | 11010111 |
| 11000011 | 01111010 | 00101110 | 11111000 | 11010010 | 10101100 | 11100001 |
| 11101011 | 00111101 | | 01111100 | 01101001 | 01010110 | 11111010 |
| 11111111 | 10010100 | | 00111110 | 10111110 | 00101011 | 01111101 |
| 11110101 | 01001010 | | 00011111 | 01011111 | 10011111 | 10110100 |
| 11110000 | 00100101 | | 10000101 | 10100101 | 11000101 | 01011010 |
| 01111000 | 10011000 | | 11001000 | 11011000 | 11101000 | 00101101 |
| 00111100 | 01001100 | | 01100100 | 01101100 | 01110100 | 10011100 |
| 00011110 | 00100110 | | 00110010 | 00110110 | 00111010 | 01001110 |
| 00101001 | 00101111 | 00111001 | 01010001 | 01010011 | 01011011 | |
| 10011110 | 10011101 | 10010110 | 10100010 | 10100011 | 10100111 | |
| 01001111 | 11000100 | 01001011 | | 11011011 | 11011001 | |
| 10101101 | 01100010 | 10101111 | | 11100111 | 11100110 | |
| 11011100 | 00110001 | 11011101 | | 11111101 | 01110011 | |
| 01101110 | 10010010 | 11100100 | | 11110110 | 10110011 | |
| 00110111 | 01001001 | 01110010 | | 01111011 | 11010011 | |
| 10010001 | 10101110 | | | 10110111 | 11100011 | |
| 11000010 | 01010111 | | | 11010001 | 11111011 | |
| 01100001 | 10100001 | | | 11100010 | 11110111 | |
| 10111010 | 11011010 | | | 01110001 | 11110001 | |
| 01011101 | 01101101 | | | 10110010 | 11110010 | |
| 10100100 | 10111100 | | | 01011001 | 01111001 | |
| 01010010 | 01011110 | | | 10100110 | 10110110 | |

The bitwise shifting and exclusive OR operations provided by the CRC process can be viewed as a multiplication operation between the register and mask in the Galois Field $GF(2^n)$. This operation is, in effect, a convolution operation in which the register bit pattern representing the digital information to be encrypted is convolved with or folded into the bit pattern of the mask.

Figure 5:
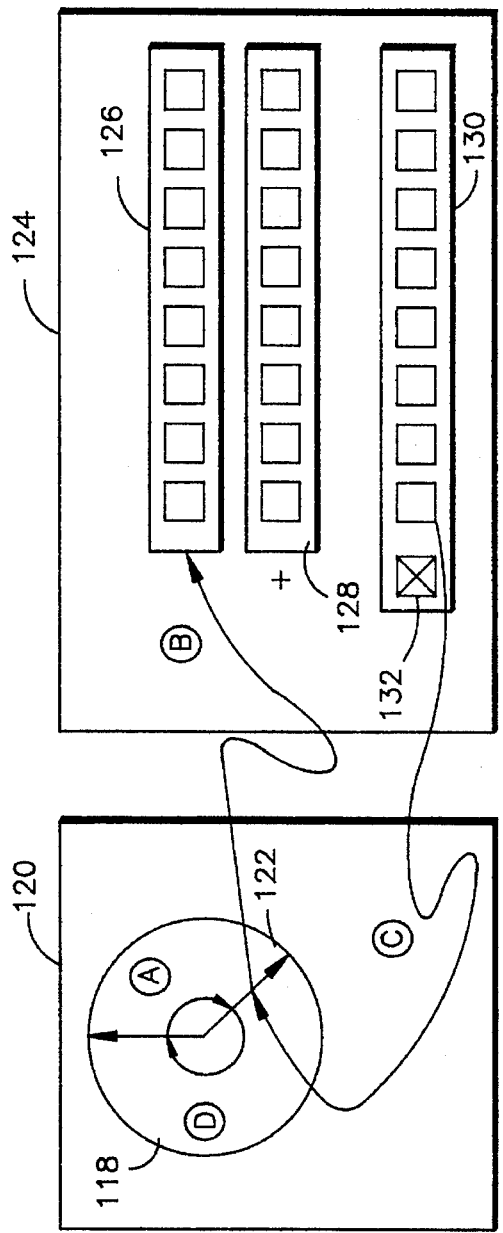
FIG. 5 is a schematic diagram illustrating the method by which the enhanced CRC process is performed to encrypt information utilizing processing steps in both the Galois Field and the Integer Ring.

Rather than performing the shifting and exclusive OR operations through a full cycle, as demonstrated by Table I, the present invention suspends or temporarily halts the convolution operation after a predetermined number of multiplications or iterations. The number of iterations performed before the CRC convolution process is suspended can be treated as a secret number or key to be used in later decrypting the resultant. In FIG. 5 the CRC convolution process is illustrated diagrammatically by circle 118. For illustration purposes, one complete cycle of n iterations (n being the number of bits in the register in this example) is diagrammatically depicted by a full rotation of 360° within circle 118. Thus during a first portion of the convolution process depicted by arc A the CRC process proceeds from its starting point at the twelve o'clock position to the suspension point (in this case at the five o'clock position). The point at which suspension occurs is arbitrary, since suspension can occur at any selected point within the full convolution cycle.

While the convolution process is occurring, as depicted by circle 118, the operations can be considered as taking place in or being represented in the Galois Field, designated generally by region 120. However, when the suspension point is reached, as at 122, the Galois Field processes are suspended and further processing occurs in the Integer Ring 124. While in the Integer Ring the intermediate resultant of previous Galois Field operations (multiplications) are operated on by a Real Field or Integer Ring process. In FIG. 5, the intermediate resultant value is depicted generally by bit pattern 126. In the presently preferred embodiment bit pattern 126 is arithmetically added with a predetermined number or bit pattern 128, with the resulting sum depicted at 130.

One characteristic of the Integer Ring operation is that a carry operation may or may not occur, depending on the value of the digits being added. That is, if digits 0+0 are added, no carry occurs, whereas if digits 1+1 are added, a carry is generated. Any carry from the most significant digit is ignored, as illustrated at 132.

After the Integer Ring operation has completed, the resultant sum is transferred back to the Galois Field as indicated by arrow C, whereupon the remainder of the CRC operation is carried out as indicated by arc D.

It will be appreciated that the options for altering the simple CRC process are numerous. The precise point at which the CRC process is suspended and the resultant transferred to the Integer Ring can be after any preselected number of iterations (the preselected number being optionally a secret number or key). In addition, the number or bit pattern 128 added while in the Real Field or Integer Ring can also be any secret number, serving as an additional key. Because carries may occur between bits of the intermediate value during the addition step in the Integer Ring, the process is nonlinear with respect to the Galois Field over which the CRC process is being performed. It will be seen that the process thus described is extremely inexpensive to implement, since it only requires one or a few additional program instructions to accomplish and may be effected in as short as a single clock cycle.

The improved encryption resulting from the above-described process may be used as a new fundamental cryptographic building block which can be combined to form a part of a more complex encryption/decryption process. For example, more than one Integer Ring operation could be performed during the CRC process to further complicate any decryption analysis. Similarly, any single or combination of information-preserving, reversible operations over the Integer Ring (e.g. addition, subtraction) can be used during the CRC. The key to effectiveness is that the Integer Ring operation must produce the possibility of inter-bit arithmetic carries, which are inherently poorly expressed by Galois Field analysis. Similarly any combination of two or more information-preserving, reversible operations over different mathematical structures, such as Groups, Rings or Fields, can be used. The key to effectiveness is that the operation in one mathemtaical structure is inherently poorly represented in one or more of the other structures.

For additional information regarding the enhanced CRC process see U.S. Pat. No. 5,398,284 to Koopman et al., entitled "Cryptographic Encoding Process."

Having thus described the invention in its presently preferred form, an analysis of the utility of the invention will now be provided. The first case to be examined is a brute force attack. Under a brute force attack device 10 sends an n-bit message X. There are $2^n$ such messages. If masking of k-bits is used, device 10 expects an (n-k)-bit response. There are $2^{n-k}$ such responses. Assuming the thief can try P responses per second, the expected time before the correct response would be returned to device 10 is

$$\frac{2^{n-k-1}}{86,400P} \text{ days}$$

Next a playback attack will be considered. For the authentication system of the invention a playback attack is no better or worse than a brute force attack. The message device 10 sends is purely random, hence equally probable from a class of $2^n$ messages. Of these messages, $2^k$ of them generate the same response ($Y_{fob}$) from the device 10. This assumes a k-bit mask. Thus, $Y_{fob}$ has (n-k) bits of information. The expected time to randomly hit the correct response is:

$$\frac{2^{n-k-1}}{86,400P} \text{ days}$$

Finally, under a cryptanalysis attack the invention immposes two levels of difficulty. One level coincides with the difficulty in determining the response value $Y_{fob}$ once X and N are known. To this level of difficulty is added the additional difficulty due to the randomness of N generated by device 10. Regarding the first level of difficulty, the enhanced CRC process is extremely difficult to break using linear analysis because the process leaves the Galois Field GF(2) to operate in the new finite field $GF(Z_2n)$. Also, the composition, if chosen such that f(x) and g(x), the two enhanced CRCs corresponding to different feedback polynomials, do not commute as operators, leads to $2^n$ combinations of enhanced CRC applications, based on the n-bit clocking key N. Thus in order to perform any crypto-breaking linear analysis the would-be thief must leave the Galois Field GF(2) and switch to the new finite field $GF(Z_2n)$ at precisely the correct loop index. This index is a shared secret between device 10 and device 12, never transmitted by either. Because f and g do not commute as operators any pure linear analysis will have the overall linear operator M changing on each separate message transmission from device 12 to device 10. That is, $$M = \prod_{i=1}^{n} M_f^{fi} M_g^{gi}$$

where $fi + gi = 1$
$fi \times gi = 0$ for each i, and there are $2^n$ such products (M depending on N). $M_f$ and $M_g$ are the matrix operators associated with linear transformation over GF(2) of the enhanced CRCs f(x) and g(x), respectively.

The consequence of this is that a transmission history does not give a wealth of information to a cryptanalyst to use in modeling the operators. Finally, concatenation with a masking n-bit bit string h(x) is used to further hide information about the enhanced CRCs f(x) and g(x).

Turning to the added difficulty due to the randomness of N, since N is transmitted in encrypted form from device 12 to device 10, a would-be thief must first crack the encryption of N before the appropriate response $Y_{fob}$ can be determined. Even if the encryption of N is only done with a simple CRC process (i.e. not enhanced) this amounts to solving the linear system over the appropriate finite field:

$$TN = N\sim$$

where neither the matrix T of one-bit entries over GF(2), nor the vector of one-bit entries corresponding to N are known. Since each N is randomly generated for every authentication probe, no history of information is ever built up to allow the cryptanalyst to solve for the elements of the matrix T over GF(2). Intercepting only N~, the output of the operator T acting on the unknown random clocking key N, does not allow the would-be thief to determine either T or N. As noted above, knowledge of N is imperative to mount a cryptanalytic attack on this system.

From the foregoing it will be seen that the present invention provides an improved cryptographic authentication process that may readily be employed in mass marketed locking systems. In addition to the vehicular applications discussed herein, the invention is also suitable for other applications, such as in a firewall system for protecting networked communications. While the invention has been described in the presently preferred form, it will be understood that certain modifications can be made without departing from the spirit of the invention as set forth in the appended claims.

We claim:

1. An attack resistant process for authenticating an access dialog between a first device and a second device in an electronic locking system, the process comprising the steps of:

at said first device:
generating a random first clocking key;
encrypting said first clocking key to produce an encrypted clocking key;
communicating said encrypted clocking key to said second device; and
using said first clocking key to perform a composition process to generate a first response code;

at said second device:
decrypting said encrypted clocking key to recover a second clocking key; and
using said second clocking key to perform said composition process to generate a second response code; and at least one of said first and second devices:
comparing said first and second response codes and authenticating said access dialog if said first and second response codes match.

2. The process of claim 1 wherein said step of decrypting said encrypted clocking key recovers a second clocking key identical to said first clocking key.

3. The process of claim 1 wherein said random first clocking key is generated using a pseudo-random number generator.

4. The process of claim 1 wherein said random first clocking key is generated using thermal noise.

5. The process of claim 1 wherein said composition process comprises a CRC process.

6. The process of claim 1 wherein said composition process comprises an enhanced CRC process.

7. The process of claim 1 wherein one of said first and second devices is coupled to a vehicle entry system, and said process further comprises the step of:

unlocking said vehicle entry system in response to authenticating said access dialog.

8. The process of claim 1 wherein one of said first and second devices is coupled to a vehicle ignition system, and said process further comprises the step of:

enabling said vehicle ignition system in response to authenticating said access dialog.

9. An electronic locking apparatus comprising:
a first device comprising:
a random number generator for generating an n-bit first clocking key;
an encryption system for encrypting said n-bit first clocking key;
a first transmitter for transmitting said encrypted n-bit first clocking key;
a first receiver; and
a first composition processor for generating a first response code based on said n-bit first clocking key;
a second device comprising:
a second receiver for receiving said encrypted n-bit first clocking key;
decryption system for recovering a second clocking key from said received encrypted n-bit first clocking key; and
a second composition processor for generating a second response code based on said second clocking key; and
an authentication system for comparing said first and second response codes and for unlocking said locking apparatus if said first and second response codes match.

10. The apparatus of claim 9 wherein said second device further has:
a message generator for generating an n-bit message; and
a second transmitter for transmitting said n-bit message;
wherein said first composition processor generates said first response code based on the n-bit message.

11. The apparatus of claim 9 wherein said authentication system comprises an authentication comparator, and said first transmitter transmits said first response code to said authentication comparator.

12. The apparatus of claim 9 wherein said random number generator uses thermal noise to produce said first clocking key.

13. The apparatus of claim 9 wherein said random number generator is a pseudo-random number generator.

14. The apparatus of claim 9 wherein said first composition processor is a CRC processor.

15. The apparatus of claim 9 wherein said first composition processor is an enhanced CRC processor.

16. The apparatus of claim 9 wherein said second composition processor is a CRC processor.

17. The apparatus of claim 9 wherein said second composition processor is an enhanced CRC processor.

18. The apparatus of claim 9 wherein said electronic locking apparatus comprises a vehicle entry system.

19. The apparatus of claim 9 wherein said electronic locking apparatus enables and disables the vehicle ignition system.

20. An attack resistant process for authenticating an access dialog between a first device and a second device in an electronic locking system, the process comprising the steps of:

at said second device:
generating a random message; and
communicating said message to said first device;
at said first device:
generating a random first clocking key;
encrypting said first clocking key to produce an encrypted clocking key;
communicating said encrypted clocking key to said second device;
receiving said message from said second device;
using said first clocking key and said message to perform a composition process to generate a first response code; and
communicating said first response code to said second device; and
at said second device:
receiving said first response code;
decrypting said encrypted clocking key to recover a second clocking key;
using said second clocking key and said message to perform said composition process to generate a second response code; and
comparing said first and second response codes and authenticating said access dialog if said first and second response codes match.

21. The process of claim 20 wherein said step of decrypting said encrypted clocking key recovers a second clocking key identical to said first clocking key.

22. The process of claim 20 wherein said random first clocking key is generated using a pseudo-random number generator.

23. The process of claim 20 wherein said random first clocking key is generated using thermal noise.

24. The process of claim 20 wherein said composition process comprises a CRC process.

25. The process of claim 20 wherein said composition process comprises an enhanced CRC process.

26. The process of claim 20 wherein said process further comprises the step of:

unlocking said vehicle entry system in response to authenticating said access dialog.

27. The process of claim 20 wherein said process further comprises the step of:

enabling said vehicle ignition system in response to authenticating said access dialog.

* * * * *